(12) United States Patent
Romanov et al.

(10) Patent No.: US 9,708,093 B2
(45) Date of Patent: Jul. 18, 2017

(54) DISPENSING CLOSURE FOR POWDERED PRODUCTS

(71) Applicant: MWV Slatersville, LLC, Slatersville, RI (US)

(72) Inventors: Sergey Romanov, Cranston, RI (US); Vincent J. Desanto, Lincoln, RI (US)

(73) Assignee: SILGAN DISPENSING SYSTEMS SLATERSVILLE LLC, North Smithfield, RI (US)

( * ) Notice: Subject to any disclaimer, the term of this patent is extended or adjusted under 35 U.S.C. 154(b) by 0 days.

(21) Appl. No.: 14/421,829

(22) PCT Filed: Aug. 16, 2013

(86) PCT No.: PCT/US2013/055265
§ 371 (c)(1),
(2) Date: Feb. 15, 2015

(87) PCT Pub. No.: WO2014/031474
PCT Pub. Date: Feb. 27, 2014

(65) Prior Publication Data
US 2015/0217895 A1 Aug. 6, 2015

Related U.S. Application Data

(60) Provisional application No. 61/691,047, filed on Aug. 20, 2012.

(51) Int. Cl.
*B65D 1/32* (2006.01)
*B65D 47/06* (2006.01)
*B65D 83/06* (2006.01)
*B05B 11/04* (2006.01)
(Continued)

(52) U.S. Cl.
CPC ............. *B65D 1/323* (2013.01); *B65D 47/06* (2013.01); *B65D 83/06* (2013.01); *G01F 11/261* (2013.01); *B05B 11/0059* (2013.01); *B05B 11/045* (2013.01); *B65D 1/326* (2013.01)

(58) Field of Classification Search
CPC ........ B65D 1/323; B65D 47/06; B65D 83/06; B65D 1/326; G01F 11/261; B05B 11/0059; B05B 11/045
See application file for complete search history.

(56) References Cited

U.S. PATENT DOCUMENTS 2,981,444 A * 4/1961 Root .................. A61M 13/00
222/211
3,194,455 A 7/1965 Castelli
(Continued)

*Primary Examiner* — Frederick C Nicolas
(74) *Attorney, Agent, or Firm* — Barlow, Josephs & Holmes, Ltd.

(57) ABSTRACT

A dispensing closure for a powdered product that uniquely meters powdered product from a container is disclosed. The dispensing closure includes an upper deck having a dispensing aperture. An inner skirt depends from the upper deck. The inner skirt is adapted to secure to a neck of a container. A tube depends from the upper deck and is sized and dimensioned to reach near the bottom of a container. The tube has a side surface and closed end. A dispensing port is located on the side surface of the tube, near the dispensing aperture. The tube may optionally have an air intake port located on the side surface of the tube near the closed end.

17 Claims, 12 Drawing Sheets

(51) Int. Cl.
    *B05B 11/00*     (2006.01)
    *G01F 11/26*     (2006.01)

(56)           References Cited

U.S. PATENT DOCUMENTS

| | | | | |
|---|---|---|---|---|
| 4,007,858 A | * | 2/1977 | Shay | B05B 11/045 |
| | | | | 222/633 |
| 4,014,468 A | * | 3/1977 | Silverman | B05B 11/043 |
| | | | | 239/327 |
| 4,091,966 A | * | 5/1978 | Laauwe | B05B 11/0059 |
| | | | | 222/211 |
| 4,261,488 A | * | 4/1981 | Bennett | B05B 11/045 |
| | | | | 222/211 |
| 4,330,072 A | * | 5/1982 | Mastman | A47K 5/122 |
| | | | | 222/209 |
| 4,356,941 A | | 11/1982 | McRoskey et al. | |
| 4,364,492 A | * | 12/1982 | Kong | B65D 50/06 |
| | | | | 222/158 |
| 5,048,709 A | * | 9/1991 | Alverson | B65D 77/28 |
| | | | | 215/229 |
| 5,301,845 A | * | 4/1994 | Labonte | B05B 11/047 |
| | | | | 222/211 |
| 5,833,124 A | | 11/1998 | Groves et al. | |
| 5,971,234 A | * | 10/1999 | Mathison | B05B 11/045 |
| | | | | 222/211 |
| 6,820,507 B2 | * | 11/2004 | Seatter | G01N 1/16 |
| | | | | 222/633 |
| 7,168,598 B2 | * | 1/2007 | Gueret | B65D 1/323 |
| | | | | 222/548 |
| 7,780,041 B2 | * | 8/2010 | Albisetti | A45D 34/02 |
| | | | | 222/211 |

\* cited by examiner

DISPENSING CLOSURE FOR POWDERED PRODUCTS

BACKGROUND OF THE INVENTION

1. Field of the Invention

The present disclosure relates to a dispensing closure and more particularly to a dispensing closure for a powdered product which allows the user to dispense a small "puff" of powdered product.

2. Background of the Related Art

Dispensing powdered products can be difficult in prior art containers because of the difficulty in controlling the amount of powdered product that is dispensed on any given squeeze of the container because of the tendency for the powdered product to cling together. As a result, sometimes barely any powdered product will be dispensed and other times too much. Accordingly, there is a perceived need in the prior art for a dispensing closure to better meter powdered products from a container.

SUMMARY OF THE INVENTION

The dispensing closure described herein solves the problems of the prior art by providing a dispensing closure for a powdered product that uniquely meters powdered product from a container. The dispensing closure includes an upper deck having a dispensing aperture. An inner skirt depends from the upper deck. The inner skirt is adapted to secure to a neck of a container. A tube depends from the upper deck and is sized and dimensioned to reach near the bottom of a container. The tube has a side surface and closed end. A dispensing port is located on the side surface of the tube, near the dispensing aperture. The tube may optionally have an air intake port located on the side surface of the tube near at the closed end.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
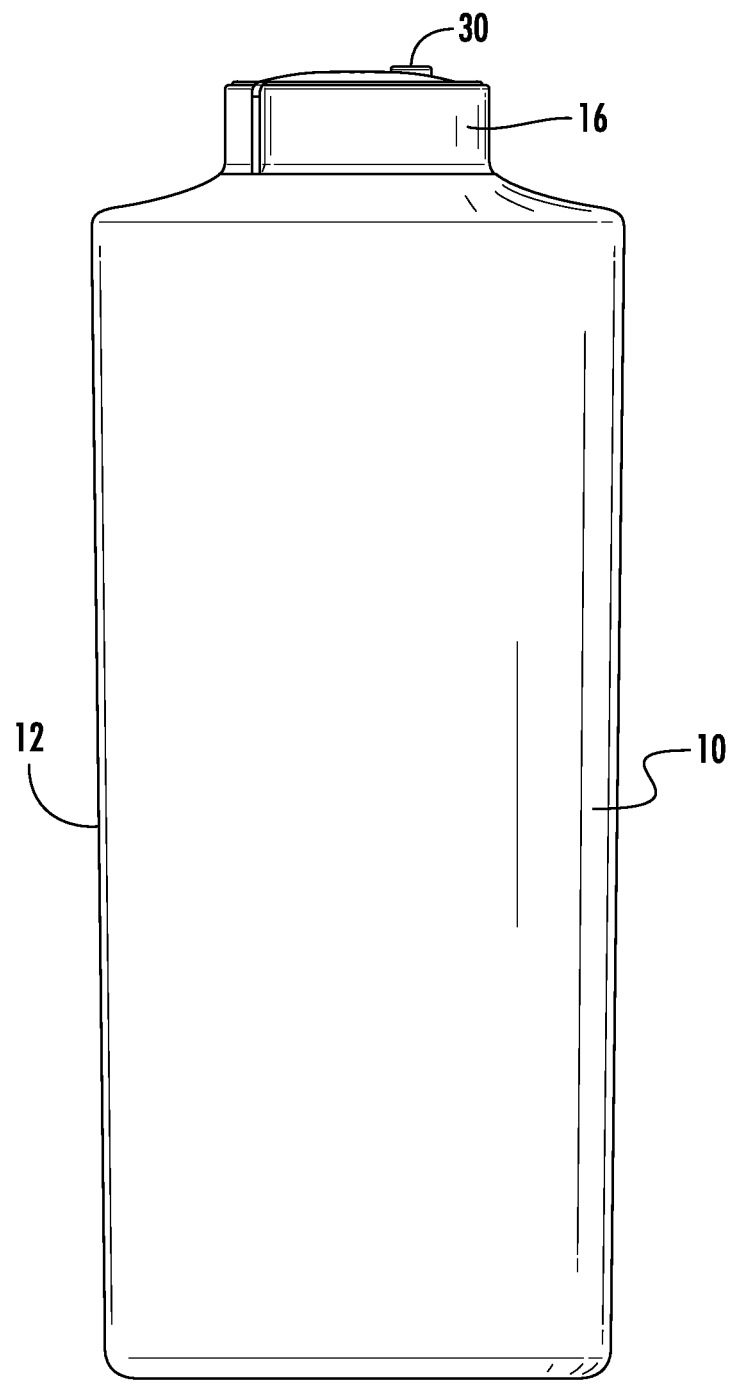
FIG. 1 is side plan view of a container with a dispensing closure made in accordance with teachings in this patent document.
Figure 2:
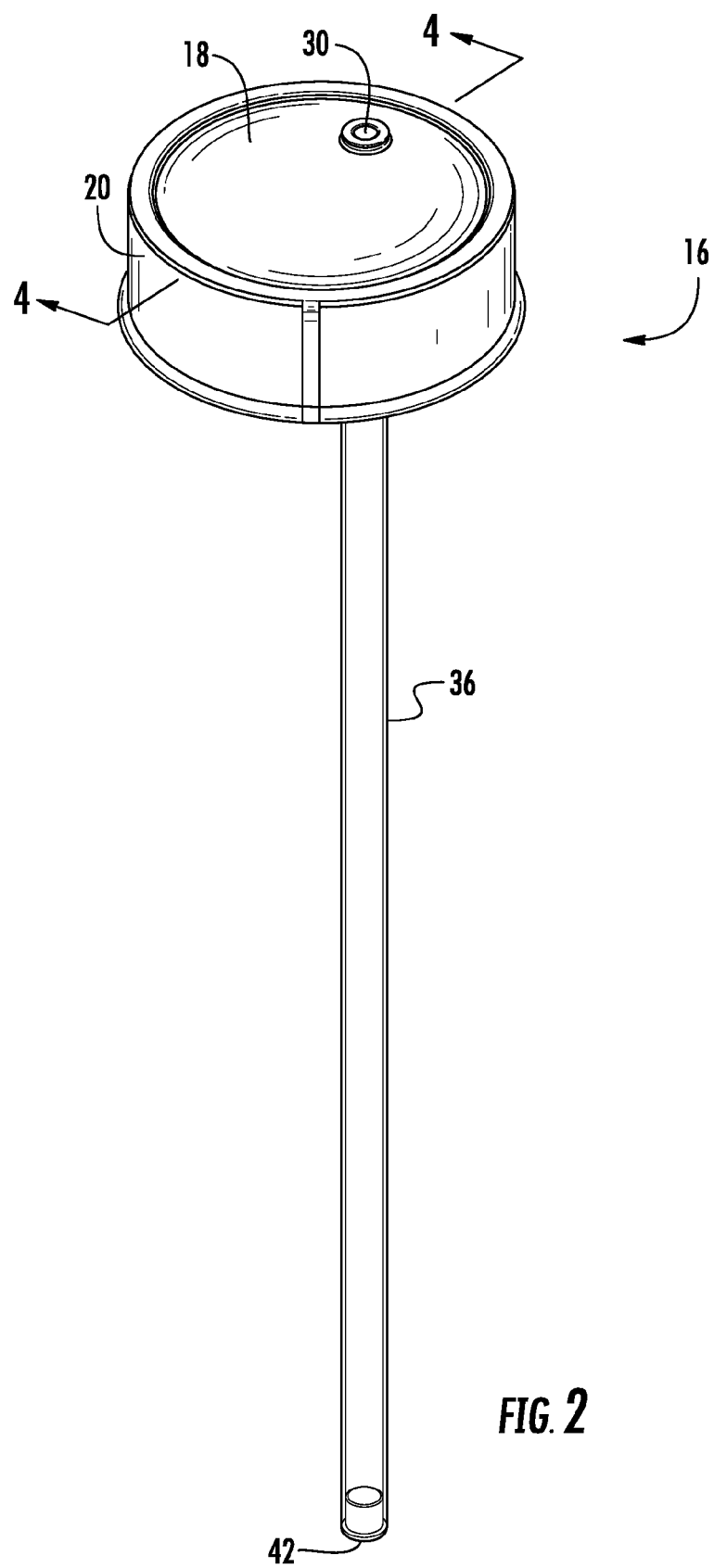
FIG. 2 is a top perspective view of a dispensing closure.
Figure 3:
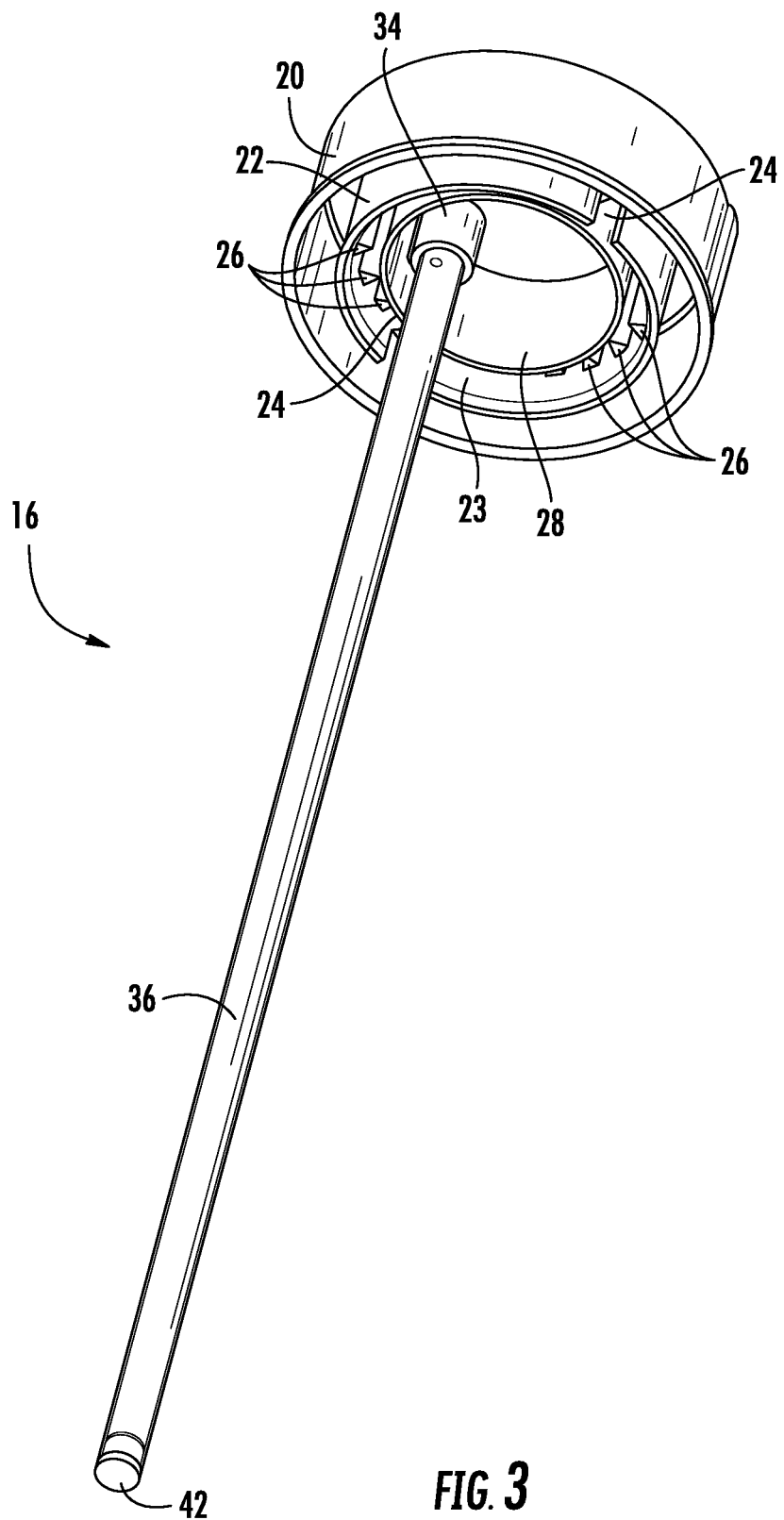
FIG. 3 is a bottom perspective view of a dispensing closure.
Figure 4:
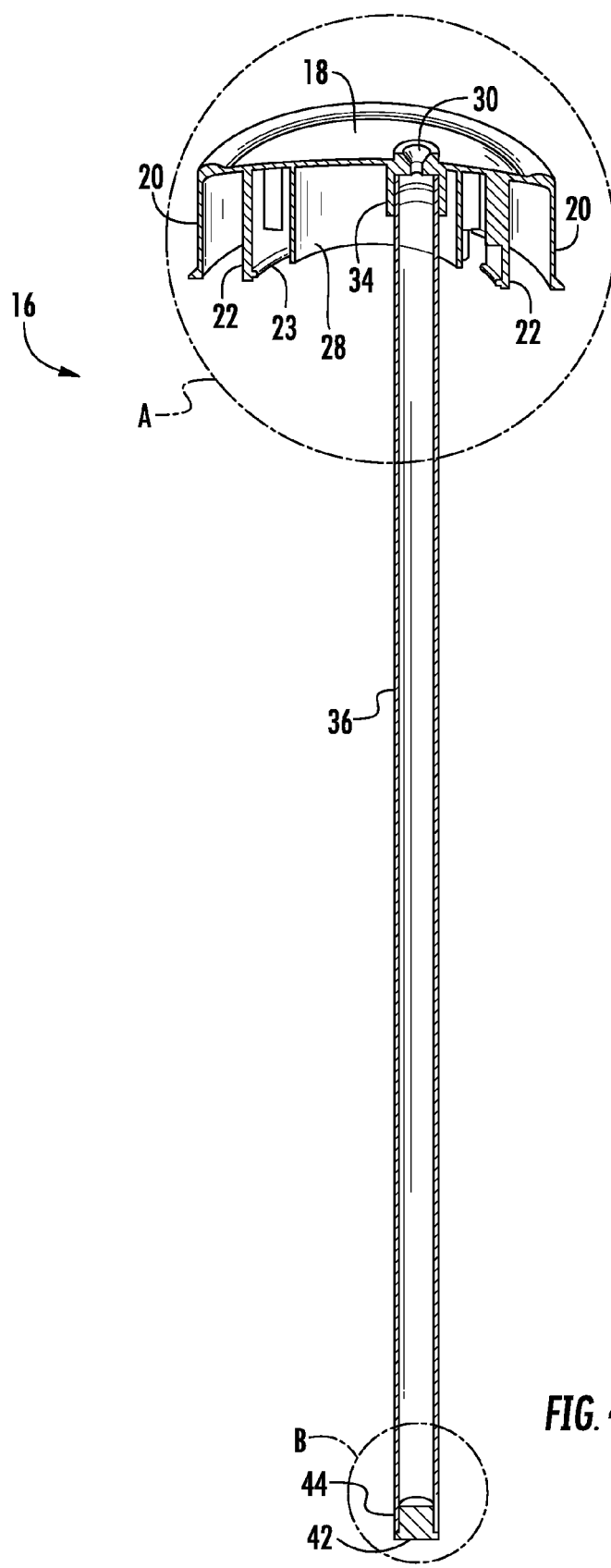
FIG. 4 is a cross-section view through line 4-4 of FIG. 2.
Figure 7:
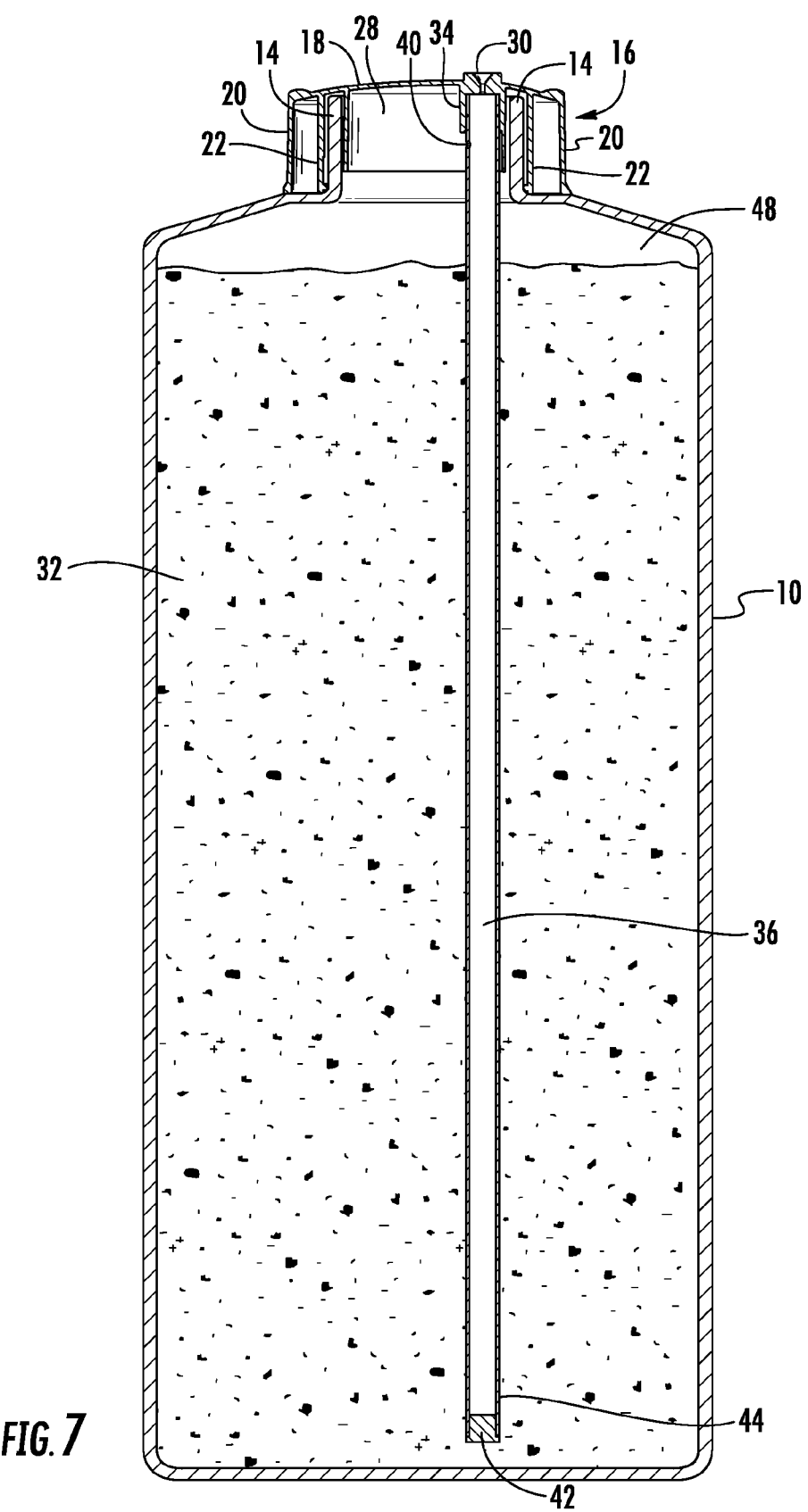
FIG. 7 is a cross-sectional view of the container and dispensing closure in the upright storage position.

Referring to FIG. 1, the container 10 includes a body portion 12 and a neck portion 14 (best seen in FIG. 7) and is molded from a flexible plastic material so that the body portion 12 can be squeezed during use. A dispensing closure 16 is fitted to the neck portion 14.

Referring to FIGS. 2-5, the dispensing closure 16 has an upper deck 18, an outer skirt 20 depending downwardly from the upper deck 18, and an inner skirt 22 having an inner surface configured and arranged to engage an outer surface of the neck portion of the container. In the illustrated embodiment, the inner skirt 22 is snap received with a snap bead 23 onto the neck portion 14 of the container R) (See FIG. 7). It is noted that the inner surface of the inner skirt 22 and the outer surface of the container lo neck portion 14 may alternatively be threaded for threaded mounting of the dispensing closure 16 on the container R) (threaded mounting not shown). The inner skirt 22 may include gaps 24 formed therein to allow the inner skirt 22 to flex around the neck portion 14 of the container 10. Furthermore the inner skirt 22 may include a number of anti-rotation lugs 26 to prevent the dispensing closure 16 from twisting on the container 10. An inner wall 28 may also be provided, which depends inside the neck portion 14 of the container lo and contacts the inside surface of the neck portion 14 of the container 10 in a sealing arrangement, preventing the powdered product 32 from leaking around the neck portion 14 of the container 10.

The upper deck 18 includes a dispensing aperture 30 to allow dispensing of the powdered product 32 from the container 10. Depending downwardly from the upper deck 18 surrounding the dispensing aperture 30 is a conduit 34 and inserted into the conduit 34 is an elongated tube 36. The conduit 34 may include a bead 38 to prevent the tube 36 from loosening from the conduit 34.

Figure 5:
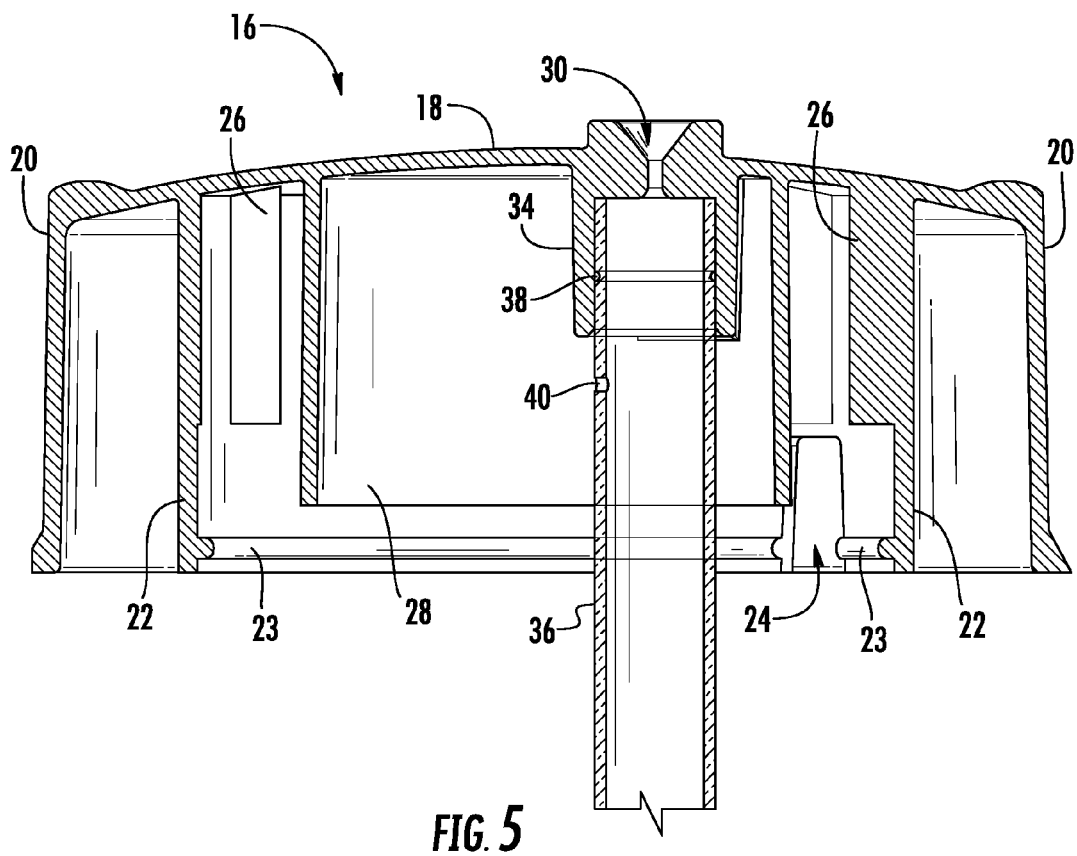
FIG. 5 is an enlarged view of inset A of FIG. 4.

The tube 36 is open at the conduit 34 end and includes a dispensing port 40 in the side surface at the conduit 34 end (See FIG. 5). When the container 10 is inverted (FIG. 8a), the powdered product 32 covers the dispensing port 40 but does not freely flow through the dispensing port 40 due to the natural tendency of powdered products 32 to cling together. Alternatively, the dispensing port 40 could be located in the conduit 34 itself.

Figure 6A:
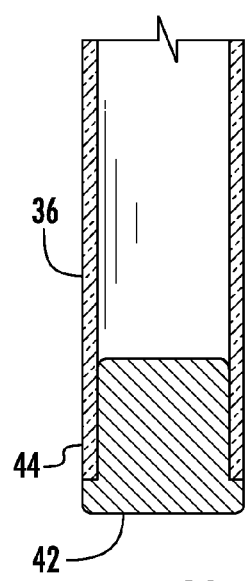
FIG. 6a is an enlarged view of inset B of FIG. 4.
Figure 6B:
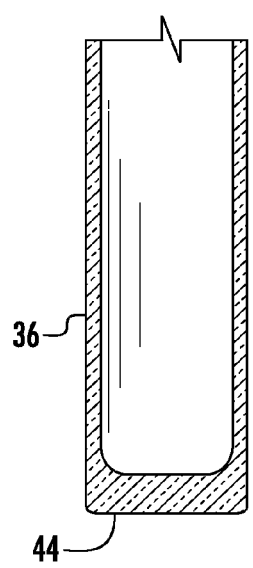
FIG. 6b is an alternative embodiment of the closed end of the tube.

Referring to FIGS. 6a and 6b, the tube 36 is closed with a stopper 42 at the opposing end 44 (FIG. 6a) or the opposing end 44 may be pinched and welded closed (FIG. 6b). The tube 36 functions as a holding chamber for a small amount of powdered product 32 before it is ejected on a subsequent squeeze of the container 10.

Referring back to FIGS. 7, 8a and 8b, in use, the container 10 is normally stored in an upright position (FIG. 7) with the dispensing closure at the top. The powdered product rests at the bottom of the container. To dispense a "puff" of product from the container, the container is inverted (FIG. 8a) so that the closure is now at the bottom. The powdered product falls to the closure end of the container and covers the dispensing port in the tube. As the powdered product falls to the cap end of the container, an air pocket is formed at the bottom end (now upper end) of the container.

Figure 8A:
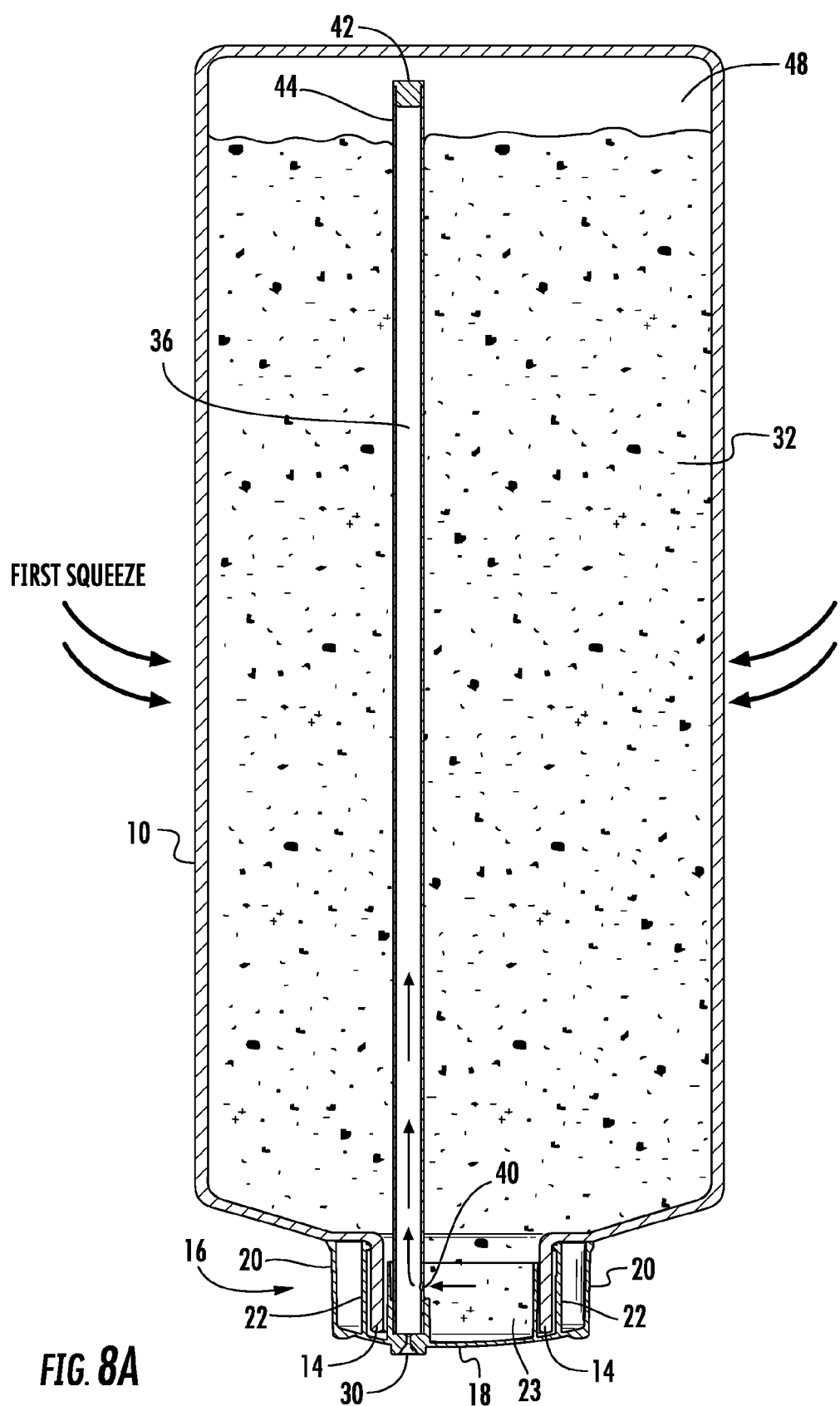
FIG. 8a is a cross-sectional view of the container and dispensing closure in the inverted dispensing position, showing the airflow after a first squeeze.
Figure 8B:
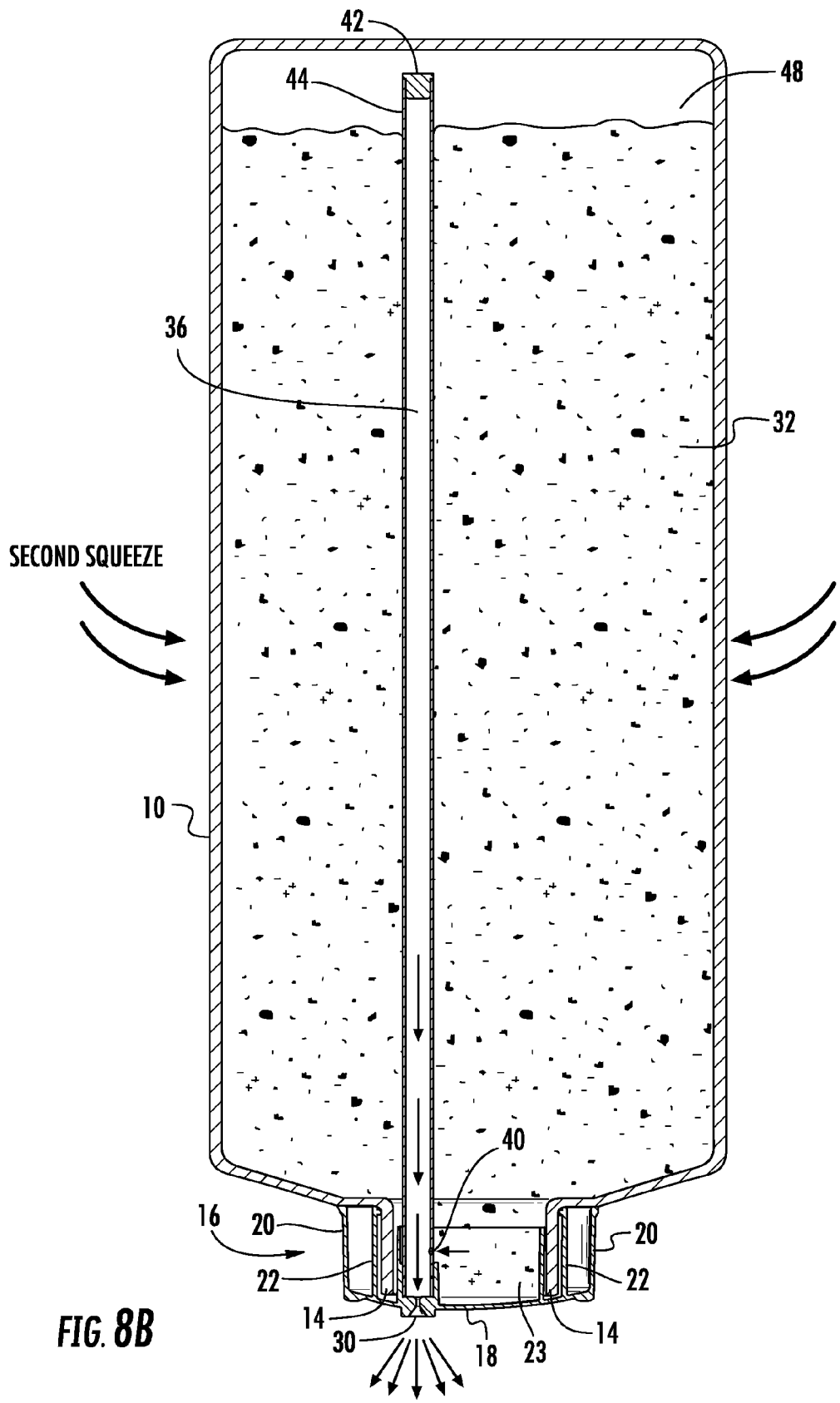
FIG. 8b is a cross-sectional view of the container and dispensing closure in the inverted dispensing position, showing the airflow after a second squeeze.

To dispense a "puff" of powdered product 32, the container 10 is squeezed (see arrows), forcing air and a small amount of powdered product 32 into the tube 36 through the dispensing port 40 (See FIG. 8a). Squeezing the container 10 again drives the powdered product 32 through the tube 36 and out the dispensing aperture 30 in a "puff" (See FIG. 8b).

Figure 9A:
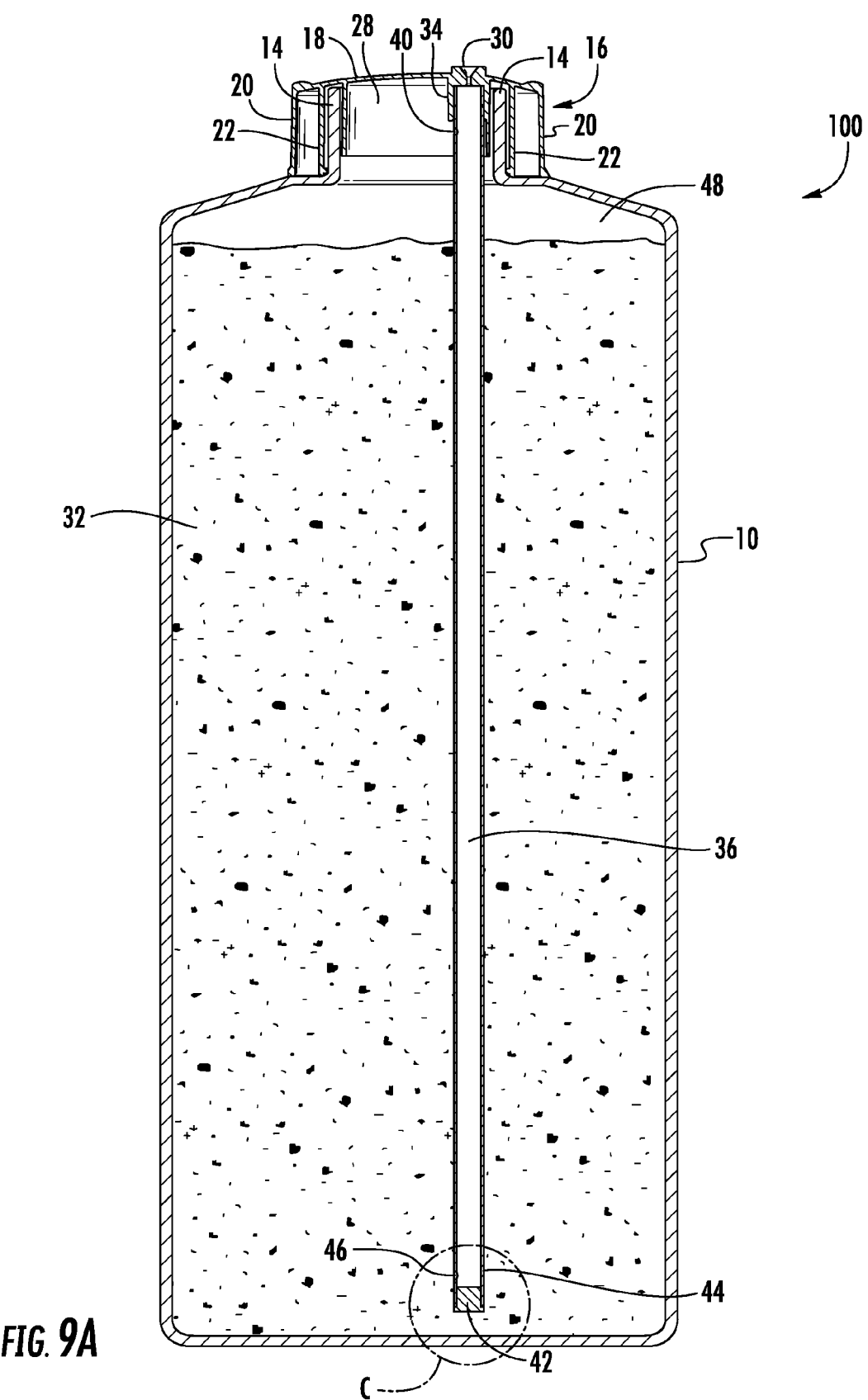
FIG. 9a is a cross-sectional view of an alternative embodiment of the container and dispensing closure in the upright storage position.
Figure 9B:
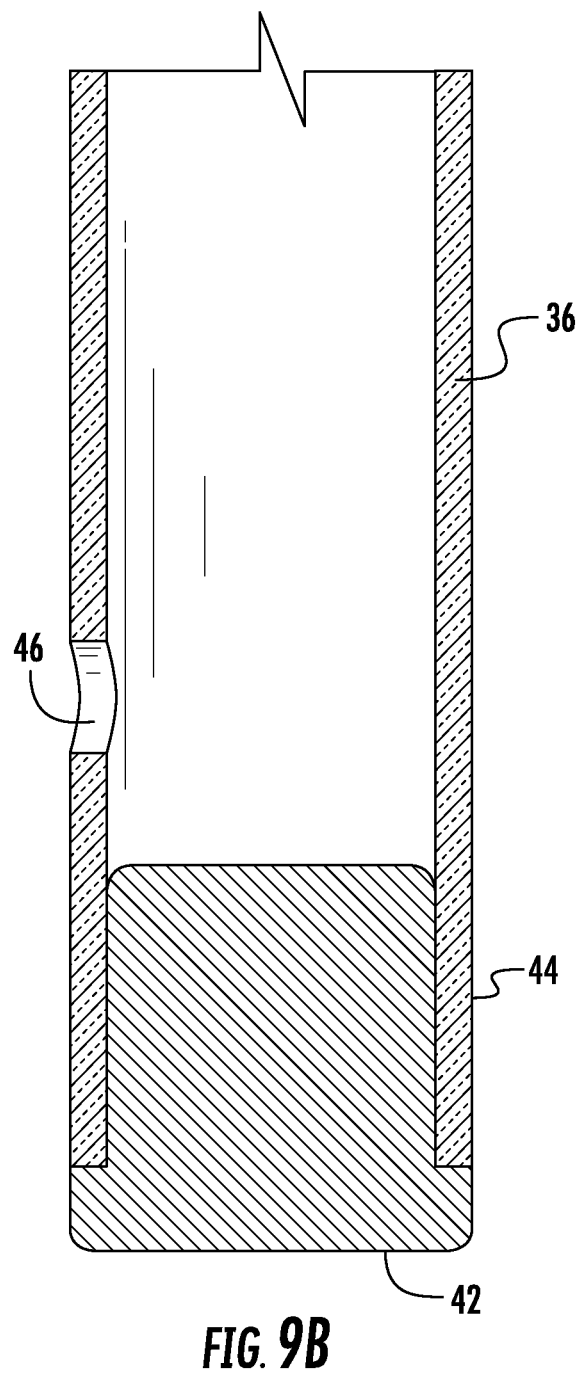
FIG. 9b is an enlarged view of inset C of FIG. 9.
Figure 9C:
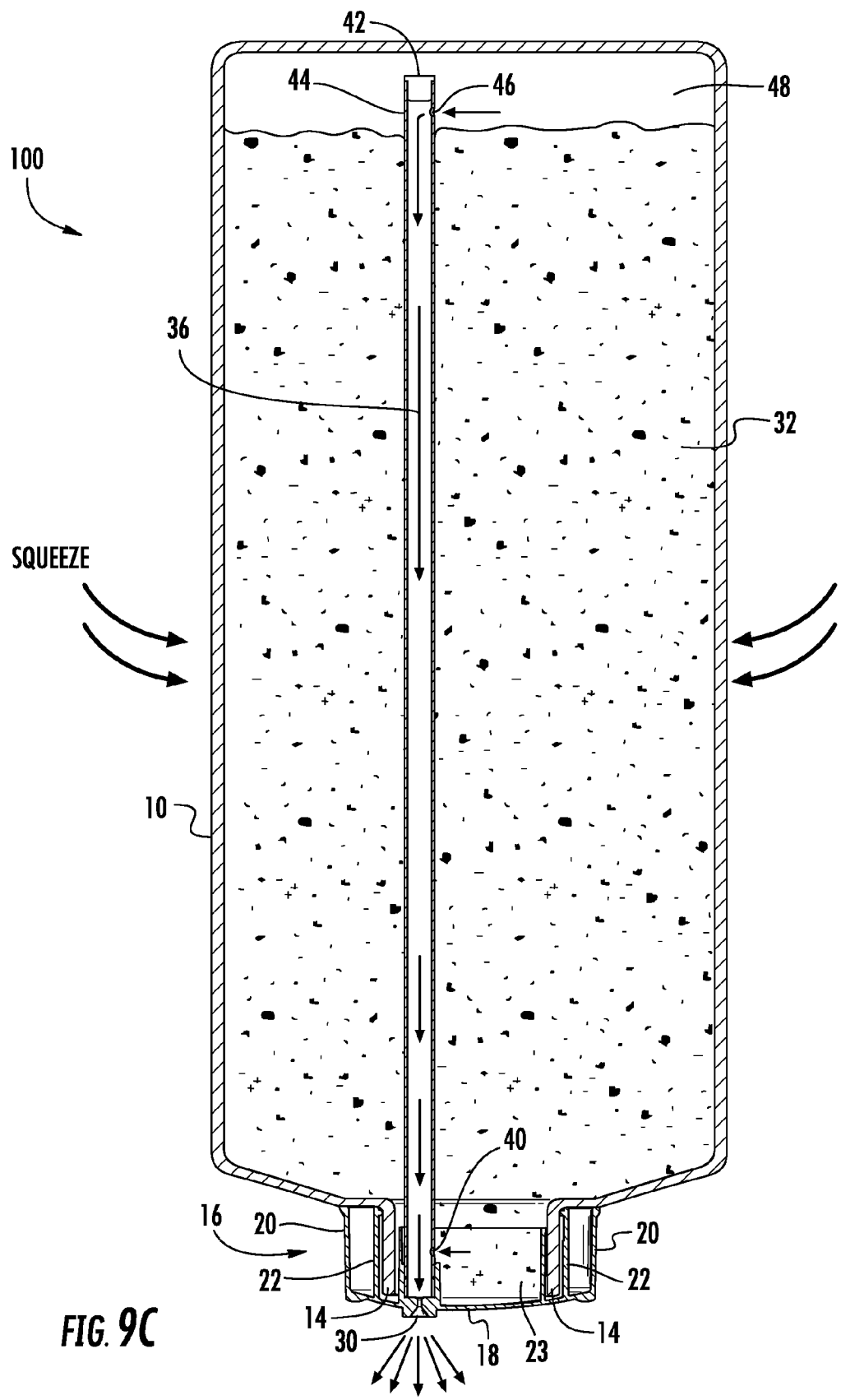
FIG. 9c is a cross-sectional view of an alternative embodiment of the container and dispensing closure in the inverted dispensing position.

In an alternative embodiment 100, shown in FIGS. 9a-c, the tube 36 may further include an optional air intake port 46 in the side surface at the closed end 44 (adjacent the bottom of the container and best seen in FIG. 9b). When the container 10 is inverted (FIG. 9c), the air intake port 46 is located in an internal air pocket 48 within the container 10 (above the upper surface of the powdered product). To dispense a "puff" of powdered product 32, the container 10 is squeezed (see arrows), forcing air into the intake port 46, through the tube 36 and out the dispensing aperture 30 (See FIG. 9c). As the air flows through the tube 36 it draws in a small amount of powdered product 32 through the dispensing port 40 which then flows out of the dispensing aperture 32 in a "puff".

An alternative construction (not shown) may provide a container and closure which are normally stored in the inverted position, which would eliminate the need to invert the container for dispensing.

Figure 10A:
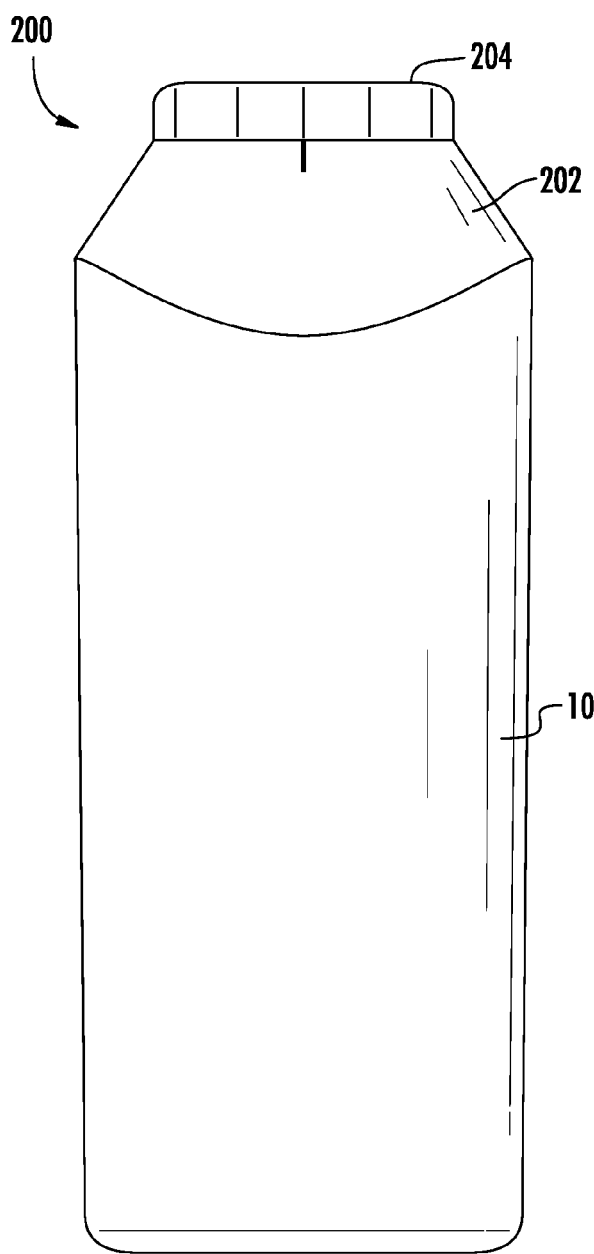
FIG. 10a is a plan view of a second alternative embodiment of a container and dispensing closure with a rotatable lid.
Figure 10B:
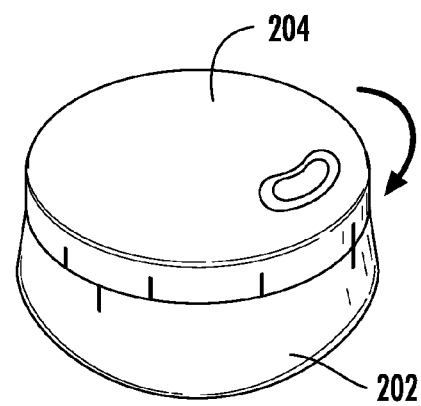
FIG. 10b is a top perspective of the lid rotated to a closed position.
Figure 10C:
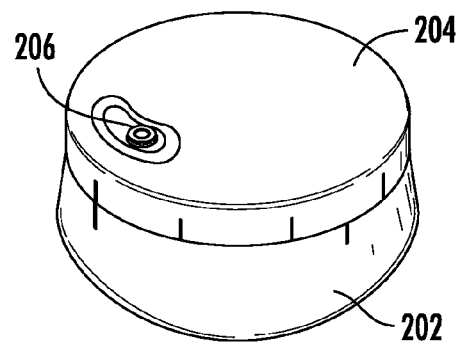
FIG. 10c is a top perspective view of the lid rotated to an open position.

Referring to FIGS. 10A-10C, another exemplary embodiment 200 of the dispensing closure includes a dispensing cap 202 having similar features and function as described hereinabove and a closure lid 204 which is rotatably mounted on the dispensing cap 202 to selectively open or close off the dispensing aperture 206.

Therefore, it can be seen that the present invention provides a unique solution to the problem of providing a dispensing closure for a powdered product that provides a metered amount of powder from a container.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A dispensing closure for a powdered product, comprising:
    an upper deck having a dispensing aperture thereon;
    an annular skirt depending from the upper deck, the annular skirt adapted to secure to a neck of a container;
    a conduit depending from the upper deck, about the dispensing aperture;
    a tube depending from the conduit, the conduit connecting the tube to the upper deck, the tube sized and dimensioned to reach near the bottom of the container, the tube having a side surface and closed end; and
    a dispensing port on the side surface of the tube, near the dispensing aperture.

2. The dispensing closure of claim 1, wherein the dispensing port is formed through the conduit.

3. The dispensing closure of claim 1, wherein the tube is separable from the conduit.

4. The dispensing closure of claim 1, wherein the closed end of the tube is sealed by a stopper.

5. The dispensing closure of claim 1, wherein the closed end of the tube is pinched and welded shut.

6. The dispensing closure of claim 1, further comprising an annular inner wall depending from the upper deck and about the dispensing aperture, the annular inner wall configured and arranged to depend into the neck of the container and engage an inside surface of the neck of the container.

7. The dispensing closure of claim 6, wherein the inner wall forms a sealing engagement with the inside surface of the neck of the container.

8. The dispensing closure of claim 1, further comprising a lid configured and arranged to close the dispensing aperture.

9. The dispensing closure of claim 8, wherein the lid rotates open and closed.

10. A dispensing closure for a powdered product, comprising:
    an upper deck having a dispensing aperture thereon;
    an annular skirt depending from the upper deck, the annular skirt adapted to secure to a neck of a container;
    a tube depending from the upper deck, the tube sized and dimensioned to reach near the bottom of the container, the tube having a side surface and closed end;
    a dispensing port on the side surface of the tube, near the dispensing aperture; and
    an air intake port on a side surface of the tube, near the closed end.

11. A dispensing closure for a powdered product, comprising:
    an upper deck having a dispensing aperture thereon;
    an inner skirt depending from the upper deck, the inner skirt adapted to secure to a neck of a container;
    an outer skirt depending from the upper deck and around the inner skirt;
    a tube depending from the upper deck, the tube sized and dimensioned to reach near the bottom of the container, the tube having a side surface and closed end; and
    a dispensing port on the side surface of the tube, near the dispensing aperture.

12. The dispensing closure of claim 11, further comprising a conduit depending from the upper deck, about the dispensing aperture, connecting the tube to the upper deck.

13. The dispensing closure of claim 12, wherein the dispensing port is formed through the conduit.

14. The dispensing closure of claim 12, wherein the tube is separable from the conduit.

15. A dispensing closure for a powdered product, comprising:
    an upper deck having a dispensing aperture thereon;
    a skirt depending from the upper deck, said skirt including a snap-bead formed on an inner surface of the inner skirt, the skirt adapted to secure to a neck of a containers;
    a conduit depending from the upper deck, about the dispensing closure;
    a tube depending from the conduit, the conduit connecting the tube to the upper deck, the tube sized and dimensioned to reach near the bottom of the container, the tube having a side surface and closed end; and
    a dispensing port on the side surface of the tube, near the dispensing aperture.

16. The dispensing closure of claim 15, wherein the dispensing port is formed through the conduit.

17. The dispensing closure of claim 15, wherein the tube is separable from the conduit.

* * * * *